(12) United States Patent
Donovan et al.

(10) Patent No.: US 7,856,618 B2
(45) Date of Patent: Dec. 21, 2010

(54) ADAPTIVELY GENERATING CODE FOR A COMPUTER PROGRAM

(75) Inventors: Robert John Donovan, Rochester, MN (US); Paul Lu Verne Godtland, Rochester, MN (US); Sherri Lynn McMeeking, Rochester, MN (US); Joseph Patrick Reynolds, Rochester, MN (US); Scott Thomas Robinson, Rochester, MN (US); Robert Ralph Roediger, Rochester, MN (US); William Jon Schmidt, Rochester, MN (US); Roger Wayne Southwick, Northfield, MN (US)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 11/197,606

(22) Filed: Aug. 4, 2005

(65) Prior Publication Data

US 2007/0033572 A1    Feb. 8, 2007

(51) Int. Cl.
G06F 9/44    (2006.01)
(52) U.S. Cl. .................................... 717/107
(58) Field of Classification Search .................. 717/107
See application file for complete search history.

(56) References Cited

U.S. PATENT DOCUMENTS

| | | | |
|---|---|---|---|
| 5,301,324 A | 4/1994 | Dewey et al. | |
| 5,361,362 A | 11/1994 | Benkeser et al. | |
| 5,600,810 A * | 2/1997 | Ohkami | ............ 712/226 |
| 5,745,757 A | 4/1998 | Lecourtier | |
| 6,128,776 A | 10/2000 | Kang | |
| 6,421,778 B1 | 7/2002 | Wood et al. | |

(Continued)

FOREIGN PATENT DOCUMENTS

WO    98/19238 A1    5/1998

OTHER PUBLICATIONS

"Hardware Mediators: A Portability Artifactfor Compon"Lecture Notes in Computer Science, Springer Berlin / Heidelberg ISSN 0302-9743 (Print) 1611-3349 (Online) vol. vol. 3207/2004 Book Embedded and Ubiquitous Computing DOI 10.1007/b100039, 2004 ISBN 978-3-540-22906-3 CategoryTrack 4: Hardware/Software Co-design and System-on-Chip pp. 271-280.*

(Continued)

*Primary Examiner*—Philip Wang
(74) *Attorney, Agent, or Firm*—Matthew J. Bussan

(57) ABSTRACT

A program feature set is compared to a processor feature set. The comparison may be performed in response to restoring the program onto a system or requesting its execution. The processor feature set represents zero, one or more optional hardware features supported by the processor, whereas the program feature set represents zero, one or more optional hardware features the program relies upon in its generated code. Comparison of the feature sets determines whether a particular program may run on a particular processor. Programs may be automatically or manually rebuilt to achieve full compatibility. If the comparison indicates that the program requires a feature not supported by the processor, the program is rebuilt based on the processor feature set. Alternatively, the program may be rebuilt in response to a rebuild request, rather than the comparison. The program is preferably rebuilt from an intermediate representation (IR) stored with or locatable from the program.

8 Claims, 9 Drawing Sheets

U.S. PATENT DOCUMENTS

| | | |
|---|---|---|
| 6,526,416 B1 | 2/2003 | Long |
| 6,539,542 B1 | 3/2003 | Cousins et al. |
| 6,625,638 B1 | 9/2003 | Kubala et al. |
| 6,768,901 B1 | 7/2004 | Osborn et al. |
| 7,139,832 B2 | 11/2006 | Kameyama et al. |
| 7,181,613 B2 | 2/2007 | Boebert et al. |
| 7,203,943 B2 | 4/2007 | Shaffer |
| 7,275,249 B1 | 9/2007 | Miller et al. |
| 7,380,238 B2 | 5/2008 | Pokhariyal |
| 7,434,213 B1 * | 10/2008 | Prakash et al. ............... 717/152 |
| 7,509,644 B2 | 3/2009 | Worley, Jr. |
| 7,587,712 B2 * | 9/2009 | Mountain et al. ........... 717/148 |
| 2002/0144247 A1 | 10/2002 | Tirumalai et al. |
| 2003/0135716 A1 * | 7/2003 | Vinitzky ..................... 712/220 |
| 2004/0015920 A1 | 1/2004 | Schmidt |
| 2004/0083459 A1 | 4/2004 | Roediger et al. |
| 2004/0199904 A1 | 10/2004 | Schmidt |
| 2005/0022173 A1 | 1/2005 | Kanade |
| 2005/0044547 A1 | 2/2005 | Gipp |
| 2006/0158354 A1 * | 7/2006 | Aberg et al. ................... 341/50 |
| 2007/0198972 A1 * | 8/2007 | Hogg et al. .................. 717/140 |

OTHER PUBLICATIONS

G L Gunsalus, "Task/CPU Affinity Design," Technical Disclosure Bulletin, vol. 16, No. 2, Jul. 1973.

* cited by examiner

ADAPTIVELY GENERATING CODE FOR A COMPUTER PROGRAM

CROSS-REFERENCE TO RELATED APPLICATION

This patent application is related to a pending U.S. patent application Ser. No. 11/197,605,filed concurrently, entitled "METHOD, APPARATUS, AND COMPUTER PROGRAM PRODUCT FOR ADAPTIVE PROCESS DIPATCH IN A COMPUTER SYSTEM HAVING A PLURALITY OF PROCESSORS", which is assigned to the assignee of the instant application.

BACKGROUND OF THE INVENTION

1. Field of Invention

The present invention relates in general to the digital data processing field. More particularly, the present invention relates to adaptive code generation for extensible processor architectures.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modem computer system typically comprises at least one central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multi-processor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternative forms of creating and executing computer software were developed. In particular, a large and varied set of high-level languages was developed for supporting the creation of computer software.

High-level languages vary in their characteristics, but all such languages are intended to make it easier for a human to write a program to perform some task. Typically, high-level languages represent instructions, fixed values, variables, and other constructs in a manner readily understandable to the human programmer rather than the computer. Such programs are not directly executable by the computer's processor. In order to run on the computer, the programs must first be transformed into a form that the processor can execute.

Transforming a high-level language program into executable form requires the human-readable program form (i.e., source code) be converted to a processor-executable form (i.e., object code). This transformation process generally results in some loss of efficiency from the standpoint of computer resource utilization. Computers are viewed as cheap resources in comparison to their human programmers. High-level languages are generally intended to make it easier for humans to write programming code, and not necessarily to improve the efficiency of the object code from the computer's standpoint. The way in which data and processes are conveniently represented in high-level languages does not necessarily correspond to the most efficient use of computer resources, but this drawback is often deemed acceptable in order to improve the performance of human programmers.

While certain inefficiencies involved in the use of high-level languages may be unavoidable, it is nevertheless desirable to develop techniques for reducing inefficiencies where practical. This has led to the use of compilers and so-called "optimizing" compilers. A compiler transforms source code to object code by looking at a stream of instructions, and attempting to use the available resources of the executing computer in the most efficient manner. For example, the compiler allocates the use of a limited number of registers in the processor based on the analysis of the instruction stream as a whole, and thus hopefully minimizes the number of load and store operations. An optimizing compiler might make even more sophisticated decisions about how a program should be encoded in object code. For example, the optimizing compiler might determine whether to encode a called procedure in the source code as a set of in-line instructions in the object code.

Processor architectures (e.g., Power, x86, etc.) are commonly viewed as static and unchanging. This perception is inaccurate, however, because processor architectures are properly characterized as extensible. Although the majority of processor functions typically do remain stable throughout the architecture's lifetime, new features are added to processor architectures over time. A well known example of this extensibility of processor architecture was the addition of a floating-point unit to the x86 processor architecture, first as an optional co-processor, and eventually as an integrated part of every x86 processor chip. Thus, even within the same processor architecture, the features possessed by one processor may differ from the features possessed by another processor.

When a new feature is added to a processor architecture, software developers are faced with a difficult choice. A computer program must be built either with or without instructions supported by the new feature. A computer program with instructions requiring the new feature is either incompatible with older hardware models that do not support these instructions and cannot be used with them, or older hardware models must use emulation to support these instructions. Emulation works by creating a trap handler that captures illegal instruction exceptions, locates the offending instruction, and emulates its behavior in software. This may require hundreds of instructions to emulate a single unsupported instruction. The resulting overhead may cause unacceptable performance delays when unsupported instructions are executed frequently.

If emulation is not acceptable for a computer program, developers may choose either to limit the computer program to processors that support the new feature, or to build two versions of the computer program, i.e., one version that uses the new feature and another version that does not use the new feature. Both of these options are disadvantageous. Limiting the computer program to processors that support the new features reduces the market reach of the computer program. Building two versions of the computer program increases the cost of development and support.

In certain object-oriented virtual machine (VM) environments, such as the Java and .NET virtual machines, this compatibility problem is solved by using just-in-time (JIT) compilation. A JIT compiler recompiles code from a common intermediate representation each time a computer program is loaded into the environment. Each computer may have a different JIT compiler that takes advantage of the features present on that computer. This is very helpful, but has a number of drawbacks. One drawback is that recompilation occurs frequently, i.e., each time the computer program is loaded. Another drawback is that JIT compilation is not a solution in non-VM environments. The vast majority of computer programs in use today are statically compiled code, and this is expected to remain the case for many years.

Because of the problems involved with exploiting new features, software developers typically will not do so until the features become common on all supported computers on their platform. This often leads to an extraordinarily lengthy time lapse between introduction of the hardware features and their general acceptance. For example, five or more years may pass between implementation of a new hardware feature and its exploitation.

A need exists for a more flexible system that allows computer programs to automatically take advantage of new hardware features when they are present, and avoid using them when they are absent.

SUMMARY OF THE INVENTION

According to a preferred embodiment of the invention, a feature set of a computer program is compared to a feature set of a processor. The comparison may be performed in response to, for example, restoring the program onto a computer system or requesting its execution. The processor feature set represents zero, one or more optional hardware features supported by the processor, whereas the program feature set represents zero, one or more optional hardware features the program relies upon in code generation (i.e., zero, one or more optional hardware features that are required to execute code contained in an object, either a module or program object). A comparison of the feature sets determines whether a particular program may run on a particular processor. Programs may be automatically or manually rebuilt to achieve full compatibility with the computer systems on which they reside. If the comparison indicates that the program requires a feature not supported by the processor, the program may be rebuilt based on the processor feature set. Alternatively, the program may be rebuilt in response to a rebuild request rather than the comparison. The program is preferably rebuilt from an intermediate language representation stored with or locatable from the program.

The foregoing and other features and advantages of the invention will be apparent from the following more particular description of the preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements.

DETAILED DESCRIPTION OF THE PREFERRED EMBODIMENTS

1.0 Overview

The present invention relates to adaptive code generation for extensible processor architectures. For those not familiar with compilers, this Overview section will provide background information that will help to understand the present invention.

Known Compilers

Figure 2:
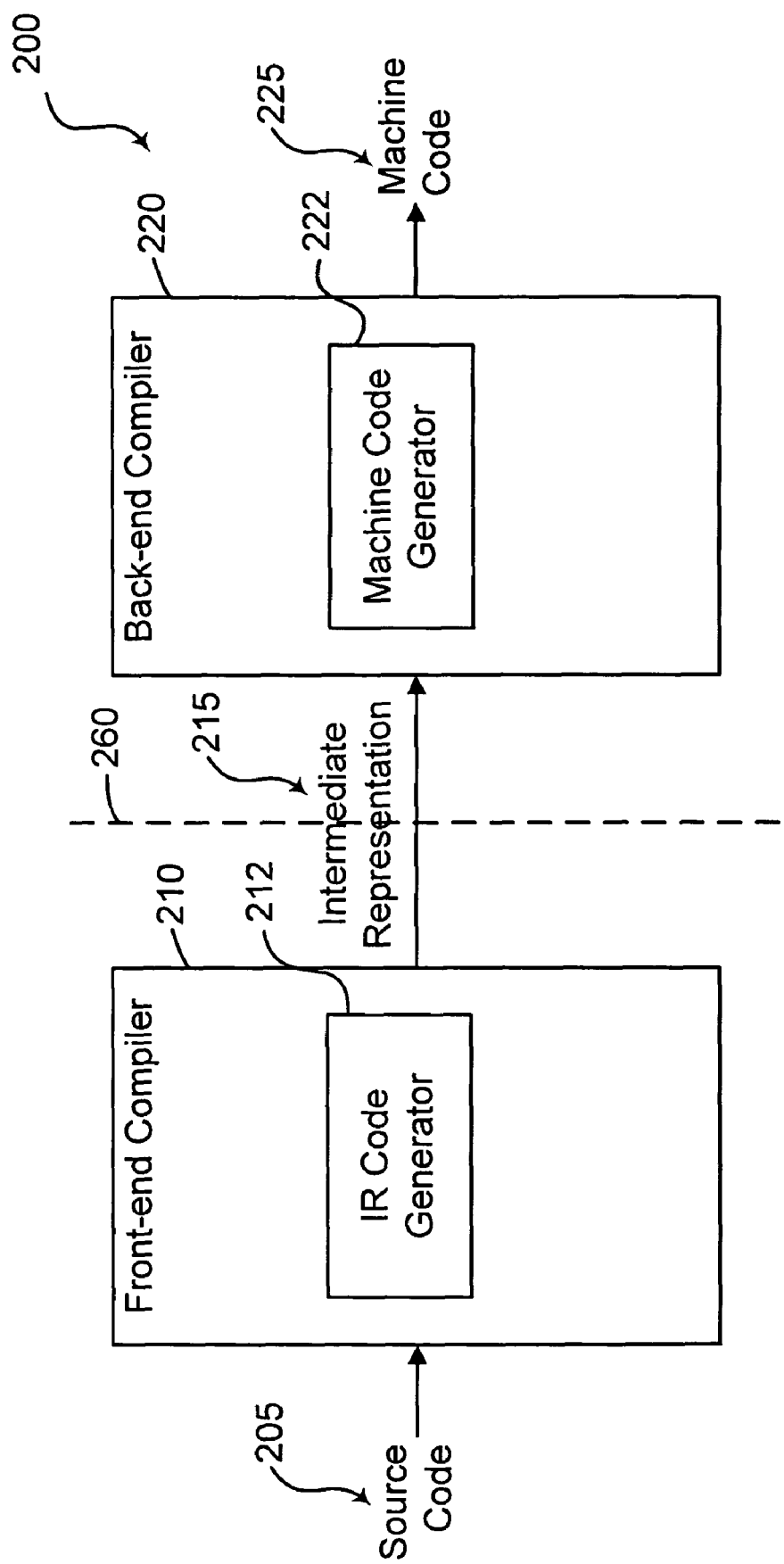
FIG. 2 is a block diagram of a prior art compiler system.

FIG. 2 illustrates a prior art compiling system 200 that includes a front-end compiler 210 and a back-end compiler 220. For most known compilers, there is an architected division (indicated by dotted line 260) between the front-end compiler 210 and the back-end compiler 220. Front-end compilers are used to convert source code to an intermediate representation. As illustrated in FIG. 2, front-end compiler 210 converts source code 205 to an intermediate representation 215. Back-end compilers are used to convert the intermediate representation to machine code for a particular hardware configuration (i.e., platform). As illustrated in FIG. 2, back-end compiler 220 converts the intermediate representation 215 to machine code 225 for a given platform (e.g., IBM eServer iSeries). This designed division between front-end compilers and back-end compilers is efficient, because it allows front-end compilers for a number of different languages (e.g., C++, Java, Ada, etc.) to be used with a single back-end compiler for a given platform (e.g., IBM eServer iSeries). Likewise, a single front-end compiler can be used with multiple back-end compilers if the code needs to be compiled to run on different platforms.

Front-end compiler 210 includes an intermediate representation (IR) code generator 212 that processes the source code 205 and generates instructions in the intermediate representation 215. Back-end compiler 220 includes a machine code generator 222 that processes the intermediate representation 215 and generates machine code 225 that is executable on a particular platform.

Figure 3:
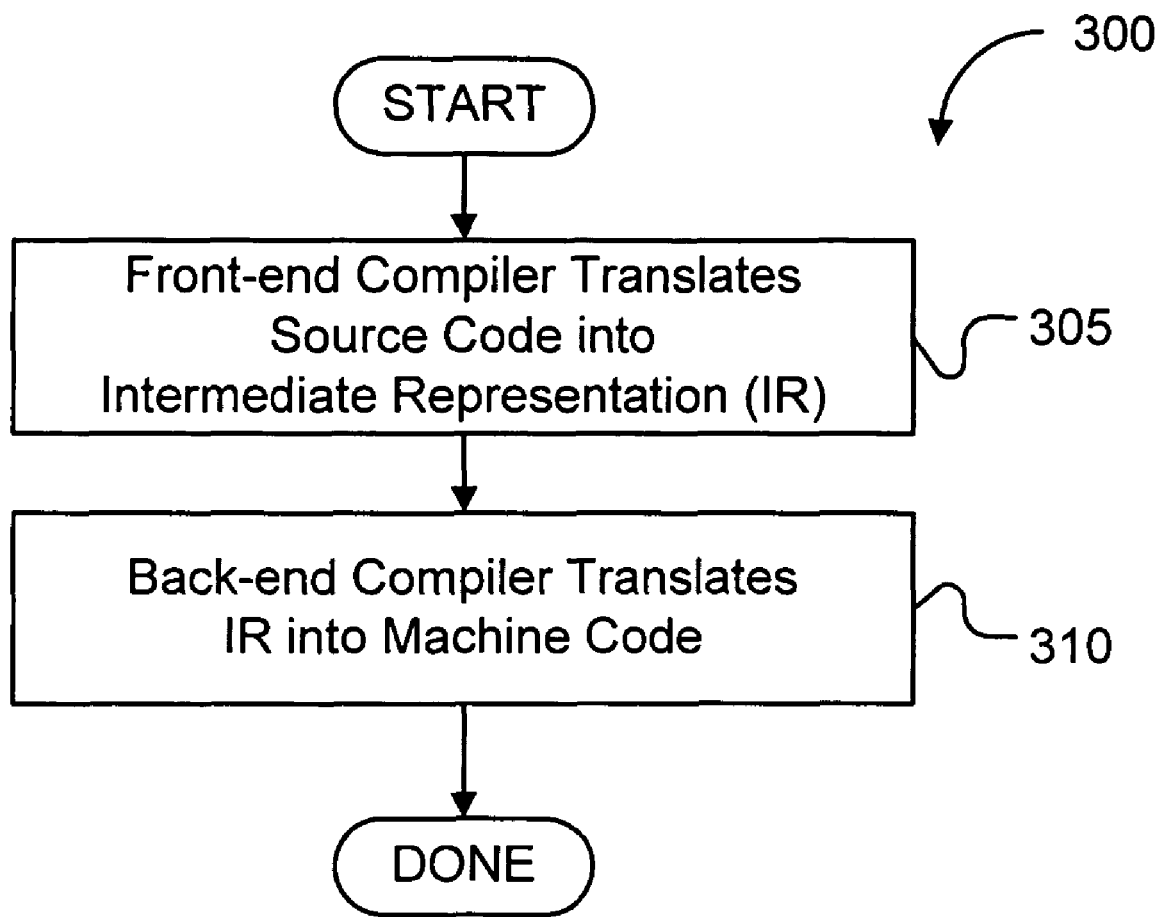
FIG. 3 is a flow diagram showing steps in a prior art method of compiling source code using the compiler system of FIG. 2.

FIG. 3 is a flow diagram of a prior art method 300 for compiling source code using the prior art compiling system 200 in FIG. 2. First, the front-end compiler translates the source code into intermediate representation (IR) code (step 305). Next, the back-end compiler processes the intermediate representation into machine code (step 310).

2.0 Detailed Description

The preferred embodiments of the present invention provide a more flexible system that allows computer programs to automatically take advantage of new hardware features when they are present, and avoid using them when they are absent.

The preferred embodiments of the present invention provide a feature set of a computer program which is compared to a feature set of a processor. The comparison may be performed in response to, for example, restoring the program onto a computer system or requesting its execution. The processor feature set represents zero, one or more optional hardware features supported by the processor, whereas the program feature set represents zero, one or more optional hardware features the program relies upon in code generation (i.e., zero, one or more optional hardware features that are required to execute code contained in an object, either a module or program object). A comparison of the feature sets determines whether a particular program may run on a particular processor. Programs may be automatically or manually rebuilt to achieve full compatibility with the computer systems on which they reside. If the comparison indicates that the program requires a feature not supported by the processor, the program may be rebuilt based on the processor feature set. Alternatively, the program may be rebuilt in response to a rebuild request rather than the comparison. The program is preferably rebuilt from an intermediate language representation stored with or locatable from the program.

Figure 1:
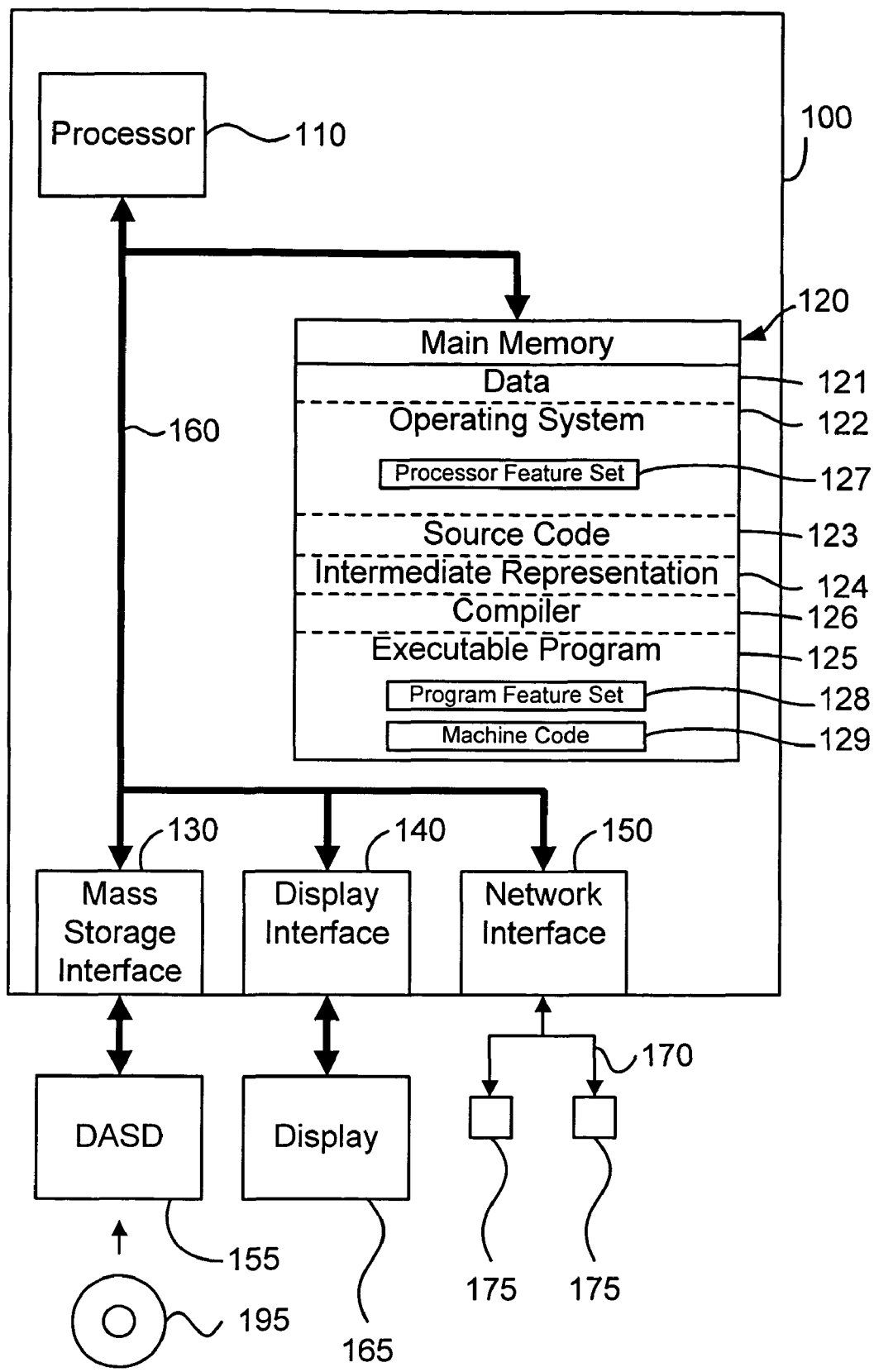
FIG. 1 is a block diagram of a computer system in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

Main memory 120 in accordance with the preferred embodiments contains data 121, an operating system 122, processor feature set 127, source code 123, an intermediate representation 124, a compiler 126, executable program 125, program feature set 128, and machine code 129. Data 121 represents any data that serves as input to or output from any program in computer system 100. Operating system 122 is a multitasking operating system known in the industry as OS/400 or IBM i5/OS; however, those skilled in the art will appreciate that the spirit and scope of the present invention is not limited to any one operating system. Source code 123 is a computer program or portion thereof written in a high-level language. Intermediate representation 124 is intermediate code that is generated from the source code 123 by a front-end compiler, which may be part of compiler 126, or be a different compiler not shown in FIG. 1. Processor 110 is a member of a processor architecture family known in the industry as PowerPC AS architecture; however, those skilled in the art will appreciate that the spirit and scope of the present invention is not limited to any one processor architecture. Processor feature set 127 represents zero, one or more optional hardware features of the processor architecture family that are supported by processor 110. Program feature set 128 represents zero, one or more optional hardware features that machine code 129 relies upon (i.e., zero, one or more optional hardware features that are required to execute machine code 129). Machine code 129 is the executable code generated by the compiler 126 from the intermediate representation 124. Executable program 125 includes machine code 129 and program feature set 128.

It should be noted a "program" as used herein and in the claims is expressly not limited to a stand-alone, fully linked object that can be executed as is. For example, executable program 125 can be any object containing machine code that may or may not be fully linked. Executable program 125 can include, for example, a static or dynamic library, a fully linked program, a module to be linked into a program, and the like.

Note that data 121, operating system 122, source code 123, intermediate representation 124, executable program 125, compiler 126, processor feature set 127, program feature set 128, and machine code 129 are all shown residing in memory 120 for the convenience of showing all of these elements in one drawing. One skilled in the art will appreciate that this is not the normal mode of operation of most compilers. A front-end compiler may process source code 123 and generate therefrom intermediate representation 124. This processing may occur on a computer system separate from the computer system 100. Compiler 126 processes intermediate representation 124 and generates therefrom program feature set 128 and machine code 129, which may occur on a separate computer system. Operating system 122 compares processor feature set 127 and program feature set 128, which may occur on yet another separate computer system. The portion of operating system 122 that restores programs onto this system will perform this check, and then potentially invoke a back-end compiler to rebuild the program. In an extreme example, source code 123 could reside on a first computer system and a front end compiler could reside on a second computer system. The front end compiler could read the source code 123 from the first computer system, generate the intermediate representation 124, and store the intermediate representation 124 on a third computer system. Compiler 126 could be executed on a fourth computer system, which reads the intermediate representation 124 from the third computer system, and generates therefrom machine code 129, as well as program feature set 128, all of which (i.e., intermediate representation 124, machine code 129, and program feature set 128) could be stored on the fourth computer system. The operating system 122 on the fifth computer system compares the processor feature set 127 contained in the operating system 122 on the fifth computer system to the program feature set 128 read from the fourth computer system, and, if the comparison indicates the computer program is compatible, restores the computer program by storing on the fifth computer system the machine code 129 read from the fourth computer system. In addition, the program feature set 128 and intermediate representation 124, each of which is read from the fourth computer system, are stored on the fifth computer system. On the other hand, if the comparison indicates that the computer program is incompatible, the operating system 122 on the fifth computer system invokes a back-end compiler to rebuild the computer program by reading the intermediate representation 124 from the fourth computer system, and to generate therefrom new machine code 129 based on processor feature set 127 contained in the operating system 122 on the fifth computer system, as well as generating a new program feature set 128, all of which (i.e., intermediate representation 124, new machine code 129, and new program feature set 128) are stored on the fifth computer system. This extreme example shows that the preferred embodiments expressly extend to any suitable configuration and number of computer systems to accomplish the front-end and back-end compiling. The "apparatus" described herein and in the claims expressly extends to a multiple computer configuration, as described by the example above.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, source code 123, intermediate representation 124, executable program 125, compiler 126, processor feature set 127, program feature set 128, and machine code 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100. For example, memory may exist in multiple levels of caches, and these caches may be further divided by function, so that one cache holds instructions while another holds non-instruction data which is to be used by the processor or processors. Multiple CPUs may share a common main memory, and memory may further be distributed and associated with different CPUs or sets of CPUs, as is known in any of various so-called non-uniform memory access (NUMA) computer architectures.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 in FIG. 1), and transmission type media such as digital and analog communications links.

Adaptive code generation (or model dependent code generation) in accordance with the preferred embodiments of the invention is built around the concept of a hardware feature set. The concept of a hardware feature set is used herein to represent optional features in a processor architecture family. This includes features which have not been and are not currently optional but which may not be available on future processor models in the same architecture family. Each element of a feature set represents one "feature" that is present in some processor models in an architecture family but is not present in other processor models in the same architecture family. Different levels of granularity may be preferable for different features. For example, one feature might represent an entire functional unit (such as a single-instruction, multiple-data (SIMD) unit and/or graphics acceleration unit), while another feature might represent a single instruction or set of instructions. SIMD units are also referred to as vector processor units or vector media extension (VMX) units, as well as by various trade names such as AltiVec, Velocity Engine, etc.

In general, a feature may represent an optional entire functional unit, an optional portion of a functional unit, an optional instruction, an optional set of instructions, an optional form of instruction, an optional performance aspect of an instruction, or an optional feature elsewhere in the architecture (e.g., in the address translation hardware, the memory nest, etc.). A feature may also represent two or more of the above-listed separate features that are lumped together as one.

A feature set is associated with each different processor model (referred to herein as a "feature set of the processor" or "processor feature set"), indicating the features supported by that processor model. The presence of a feature in a processor feature set constitutes a contract that the code generated to take advantage of that feature will work on that processor model. A feature set is also associated with each program (referred to herein as a "feature set of the program" or "program feature set"), indicating the features that the program relies upon in its generated code (i.e., the optional hardware features that are required to execute code contained in an object, either a module or program object). That is, the program feature set is recorded based on the use by a module or program object of optional hardware features.

According to the preferred embodiments of the invention, each module or program object will contain a program feature set indicating the features that the object depends on in order to be used. A program will not execute on a processor model without all required features unless the program is rebuilt.

Figure 4:
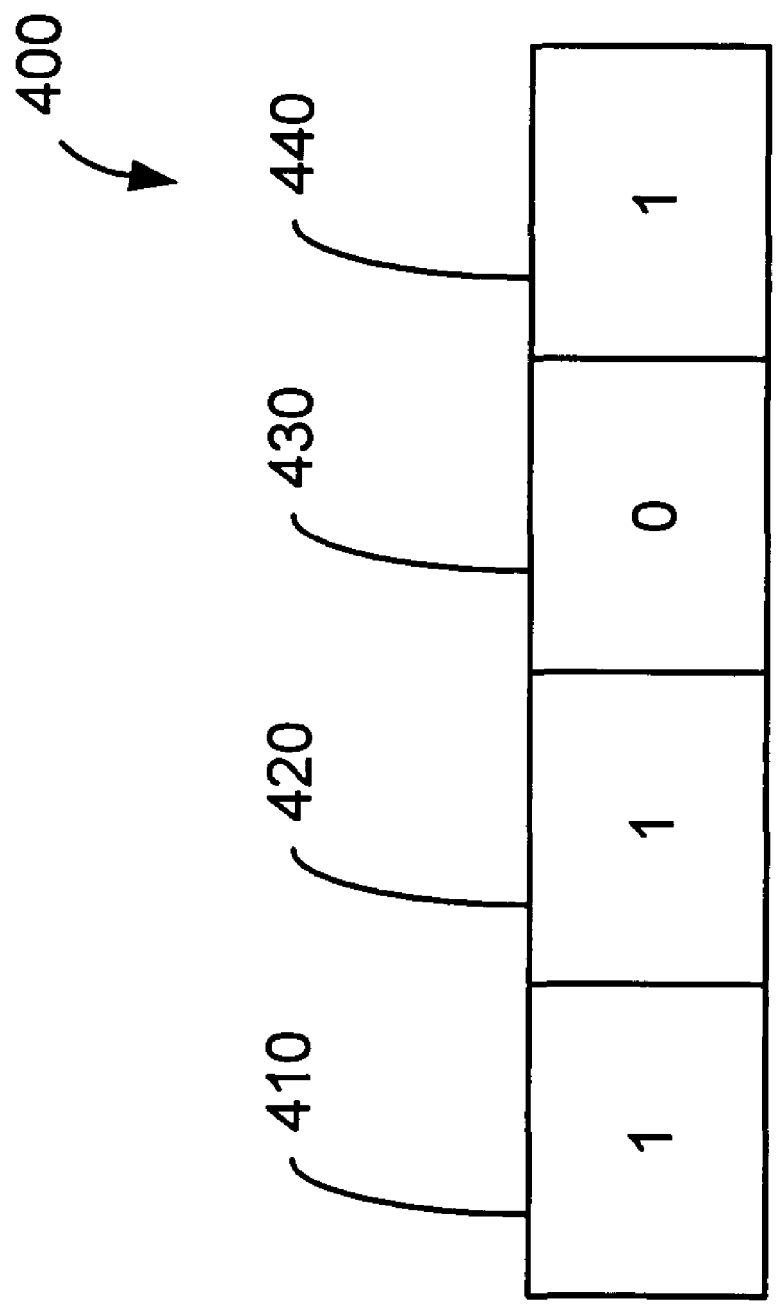
FIG. 4 is a schematic diagram showing an exemplary format of a processor feature set in accordance with the preferred embodiments.

FIG. 4 illustrates an exemplary format of a processor feature set. The processor feature set format shown in FIG. 4 is one of any number of possible formats and is shown for illustrative purposes. Those skilled in the art will appreciate that the spirit and scope of the present invention is not limited to any one format of the processor feature set. Referring again to FIG. 4, a processor feature set 400 includes a plurality of fields 410, 420, 430 and 440. Depending on the particular processor feature set, the various fields 410, 420, 430 and 440 each correspond to a particular feature and each has a "0" or "1" value. For example, field 410 may correspond to a SIMD unit, field 420 may correspond to a graphics acceleration unit, field 430 may correspond to a single instruction or set of instructions designed to support compression, and field 440 may correspond to a single instruction or set of instructions designed to support encryption. In the particular processor feature set 400 illustrated in FIG. 4, the values of the fields 410, 420, 430 and 440 indicate that the processor model with which the processor feature set 400 is associated includes a SIMD unit, a graphics acceleration unit, and the single instruction or set of instructions designed to support encryption, but not the single instruction or set of instructions designed to support compression. In addition, the format of the processor feature set may include one or more additional fields that correspond to features that are not currently optional but may not be available on future processor models in the processor architecture family and/or fields reserved for use with respect to other optional features that will be supported by the processor architecture family in the future. Also, the format of the processor feature set may include one or more fields each combining two or more features.

Figure 5:
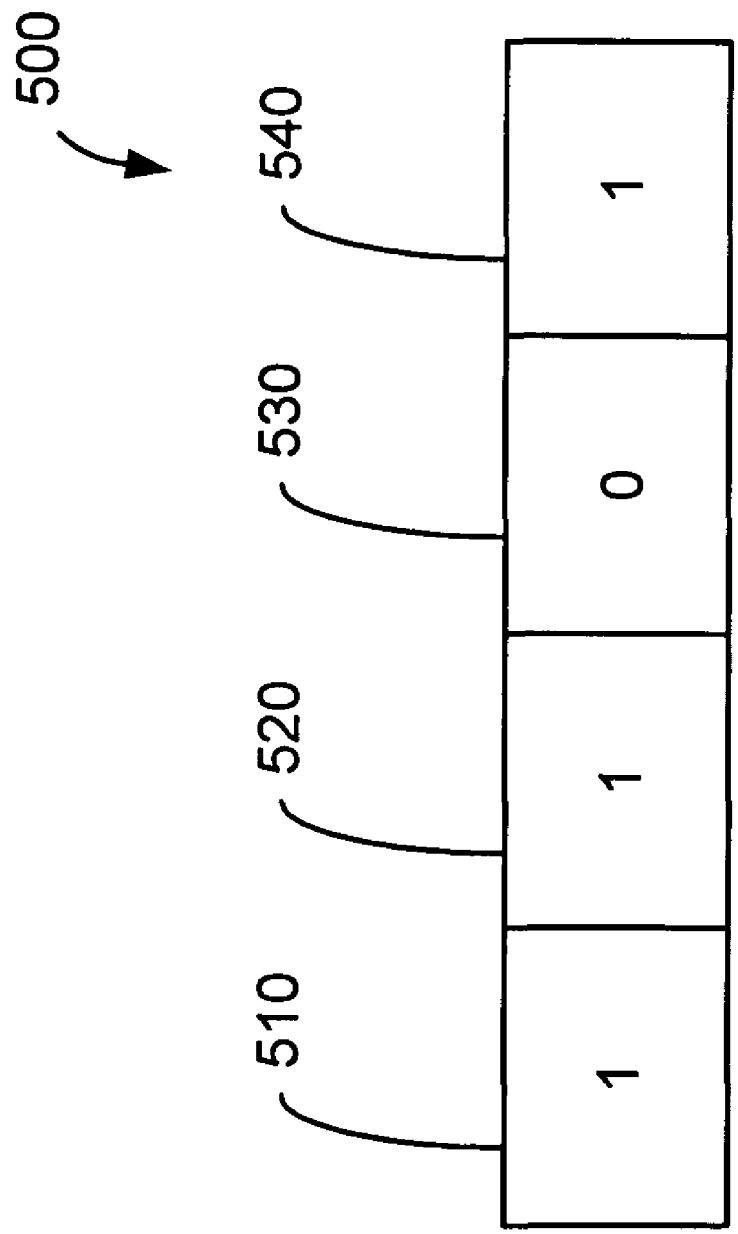
FIG. 5 is a schematic diagram showing an exemplary format of a program feature set in accordance with the preferred embodiments.

FIG. 5 illustrates an exemplary format of a program feature set. The program feature set format shown in FIG. 5 is one of any number of possible formats and is shown for illustrative purposes. Those skilled in the art will appreciate that the spirit and scope of the present invention is not limited to any one format of the program feature set. Referring again to FIG. 5, a program feature set 500 includes a plurality of fields 510, 520, 530 and 540. Depending on the particular processor feature set, the various fields 510, 520, 530 and 540, each correspond to a particular feature and each has a "0" or "1" value. For example, field 510 may correspond to use of a SIMD unit, field 520 may correspond to use of a graphics acceleration unit, field 530 may correspond to use of a single instruction or set of instructions designed to support compression, and field 540 may correspond to use of a single instruction or set of instructions designed to support encryption. In the particular program feature set 500 illustrated in FIG. 5, the values of the fields 510, 520, 530 and 540 indicate that the computer program (module or program object) with which the program feature set 500 is associated uses a SIMD unit, a graphics acceleration unit, and the single instruction or set of instructions designed to support encryption in its code generation, but does not use the single instruction or set of instructions designed to support compression. In addition, the format of the program feature set may include one or more additional fields that correspond to the module or program object's use of features that are not currently optional but may not be available on future processor models in the processor architecture family and/or fields reserved for use with respect to the module or program object's use of other optional features that will be supported by the processor architecture family in the future. Also, the format of the program feature set may include one or more fields each combining use of two or more features.

FIGS. 4 and 5 illustrate the same exemplary format for both a processor feature set and a program feature set. This is typical, but is not necessary. Any set-representation format can be used for each.

Figure 6:
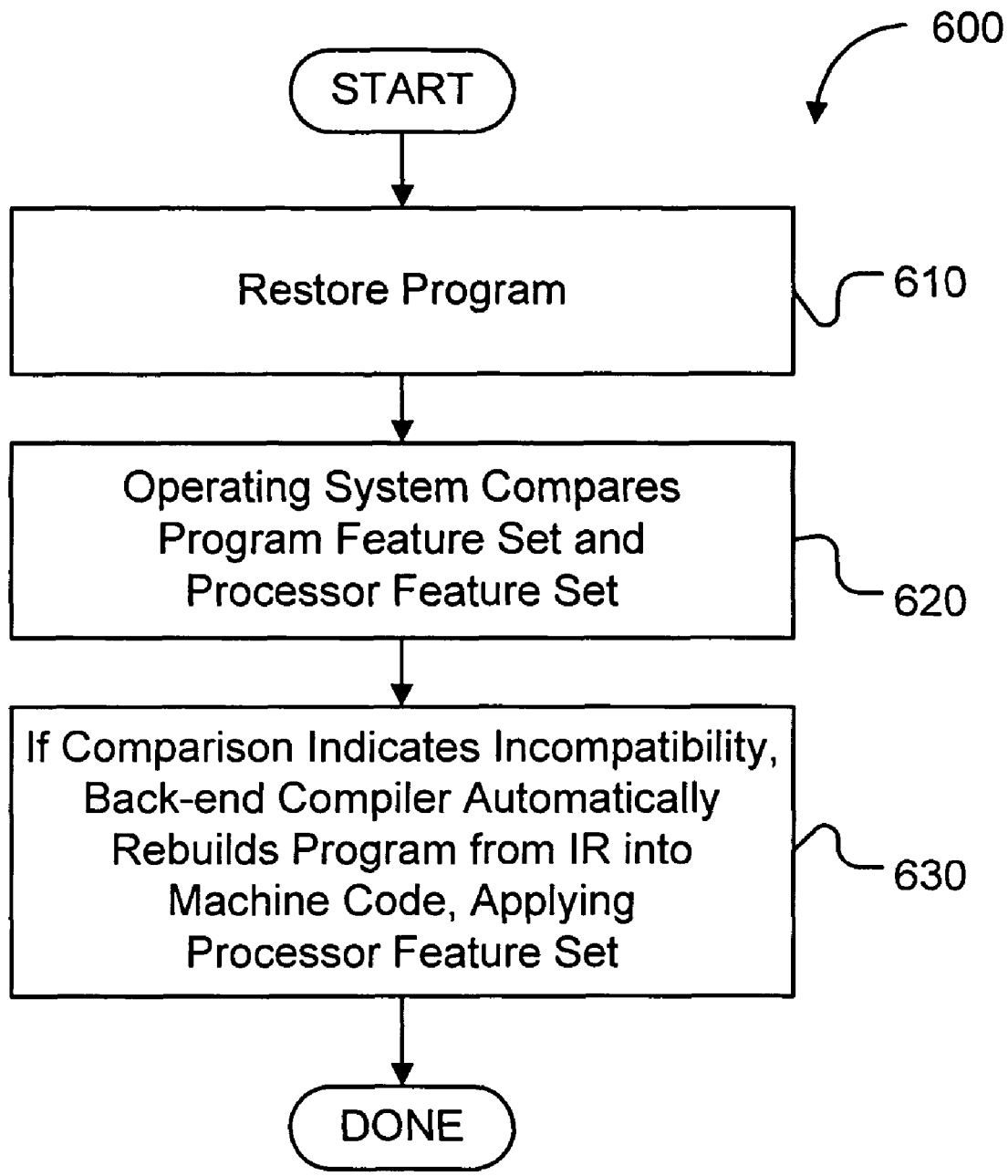
FIG. 6 is a flow diagram showing a method for adaptively generating code for a computer program by automatically rebuilding the program in accordance with the preferred embodiments.

FIG. 6 is a flow diagram showing a method 600 for adaptively generating code for a computer program by automatically rebuilding the program in accordance with the preferred embodiments. Method 600 begins when a program is restored onto a computer system (step 610). Next, the feature set of the program is compared with the feature set of the processor (step 620). Preferably, the comparison of step 620 is performed in response to restoring the program at step 610. However, the comparison of step 620 may be performed in response to other events, such as a request to execute the program. If the comparison of step 620 indicates that the program requires a feature not supported by the processor, the program is automatically rebuilt from its intermediate representation to take advantage of only those features available on the local processor (step 630) by applying the processor feature set. Preferably, the automatic rebuilding of the program of step 630 may be overridden by the user. For example, if the automatic rebuilding of step 630 is overridden by the user, the program may be retained as-is and flagged as incompatible if the comparison of step 620 indicates that the program requires a feature not supported by the processor.

Figure 7:
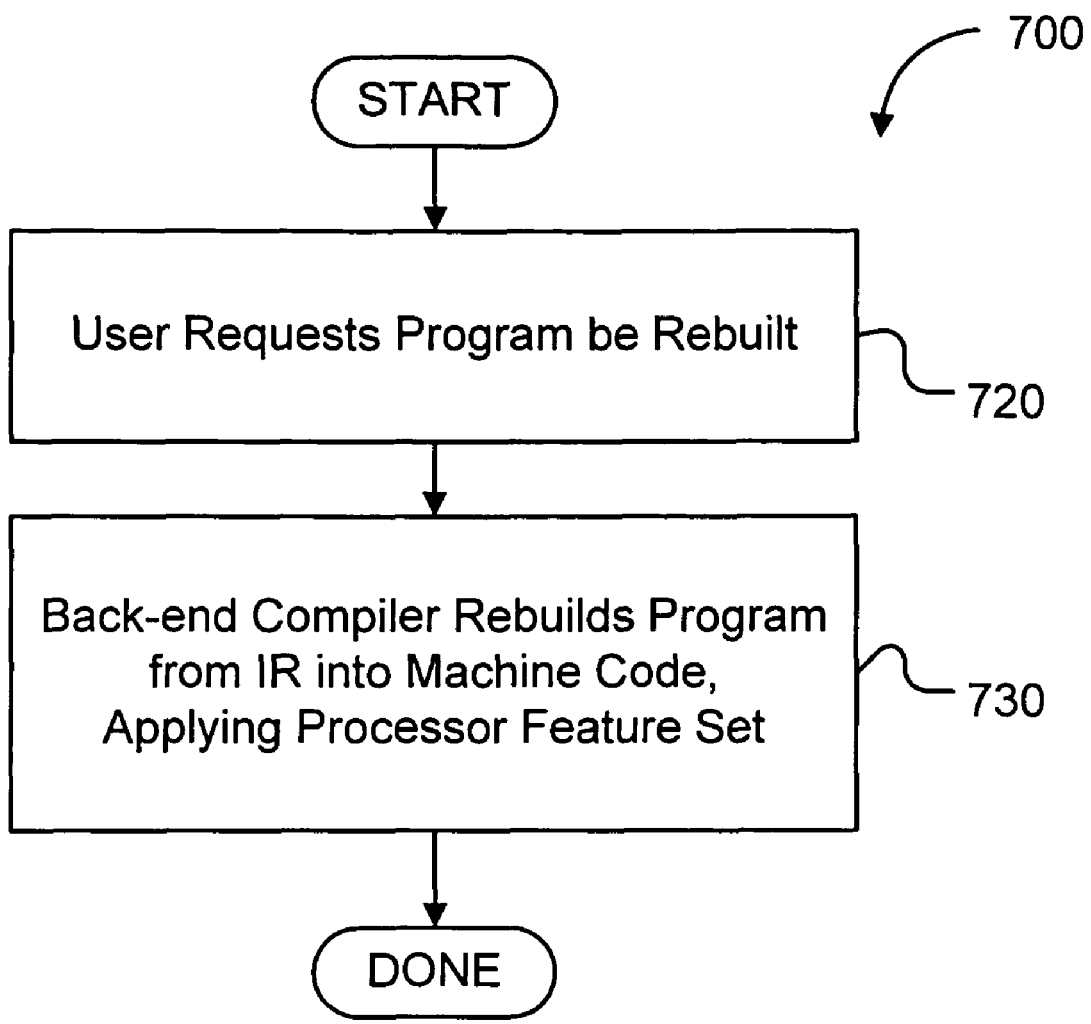
FIG. 7 is a flow diagram showing a method for adaptively generating code for a program by rebuilding the program in response to the user's rebuild request in accordance with the preferred embodiments.

Additionally, according to the preferred embodiments, a user may specifically request that a program be rebuilt on the user's computer system. FIG. 7 is a flow diagram showing a method for adaptively generating code for a computer program by rebuilding the program in response to the user's rebuild request. Method 700 begins when the user requests that the program be rebuilt (step 720). The program is then rebuilt from its intermediate representation to take advantage of only those features available on the local processor (step 730) by applying the processor feature set. This permits legacy code to immediately take advantage of new hardware features, without waiting for a new processor-specific version of the legacy code.

As has been stated, the default when creating or rebuilding a program is to take advantage of all features available on the local processor. A compiler switch may also be provided that permits individual features to be added or removed from the set of features to be exploited by the compiler. This can be implemented using separate compiler switches for each feature, by a single mask value for masking off elements of the feature set, or by other appropriate means.

According to the preferred embodiments of the invention, there are two distinct ways in which code can be generated for a module or program object, which we will denote: 1) object (re-)creation; and 2) object conversion. As used herein and in the claims, the terminology "program object" is defined as either a program or a library, and "module object" is defined as a separately compiled module. Object (re-)creation refers to both creation of objects from source code and rebuilding of objects from the intermediate language representation. The distinguishing feature of object (re-)creation is that it permits changes to some object creation options. Object (re-)creation is discussed below with reference to FIGS. 8 and 9. Object conversion refers to implicit rebuilding of objects from their intermediate language representation. Object conversion always maintains the existing creation options. According to the preferred embodiments of the invention, object conversion is an implicit process to rebuild an object using the object's intermediate representation. Object conversion may be initiated, for example, when a program or module object is restored or when a program is loaded for execution. Object conversion is discussed below with reference to FIG. 9.

Figure 8:
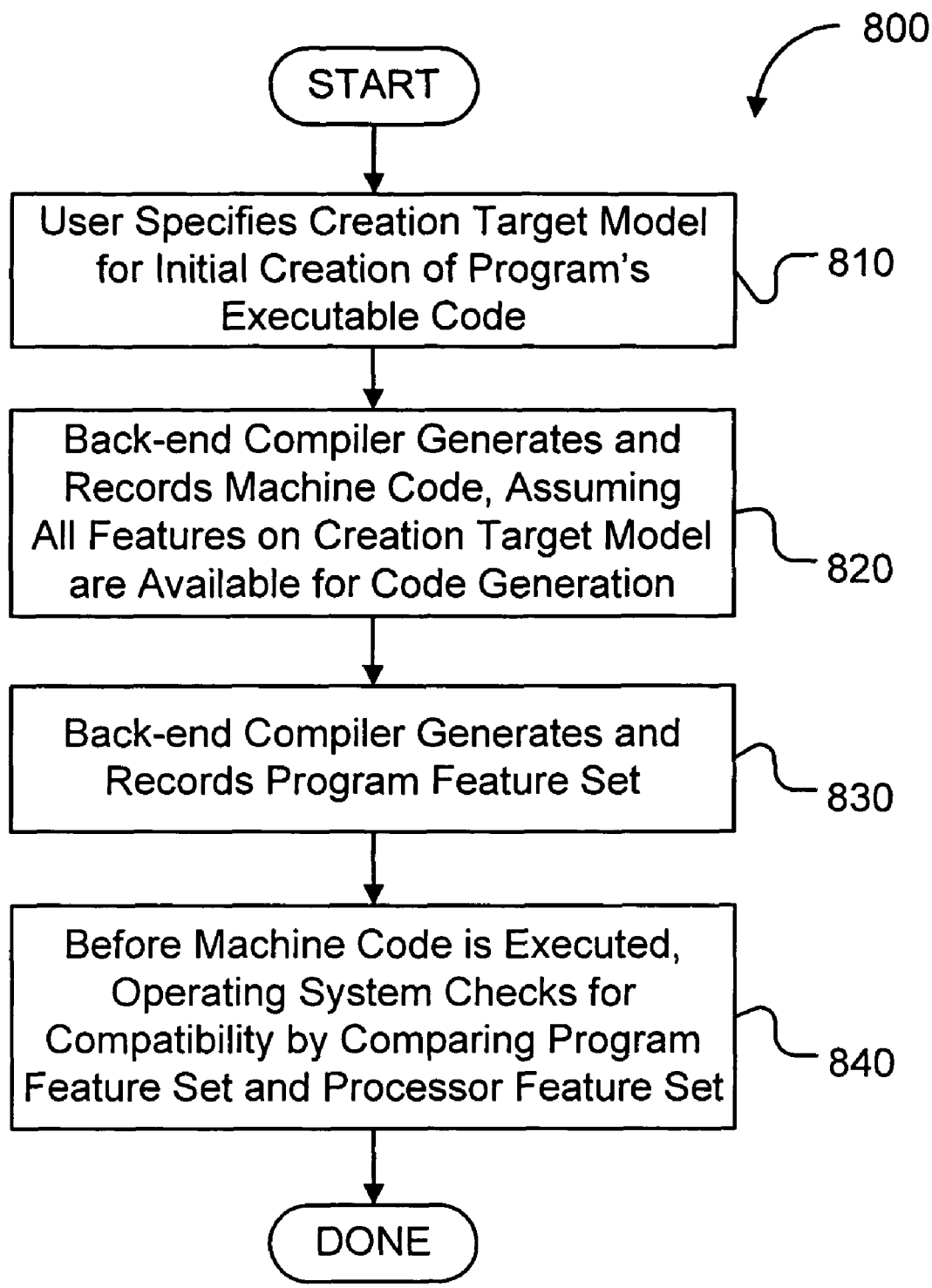
FIG. 8 is a flow diagram showing a method for adaptively generating code when compiling a computer program in accordance with the preferred embodiments.

FIG. 8 is a flow diagram showing a method 800 for adaptively generating code when compiling a computer program in accordance with the preferred embodiments. Method 800 generates code for a module or program object through object (re-)creation. According to the preferred embodiments of the invention, module or program (re-)creation is an explicit process to create a module or program object. For example, on IBM eServer iSeries systems, module (re-)creation can be initiated with commands such as (CRTxxxMOD), CHGMOD, CHGPGM, and CHGSRVPGM.

When a program is compiled, the user specifies a creation target processor model (also referred to herein as "creation target model" ) for the program's initial creation (step 810). The creation target model indicates that code generated for the object may take advantage of all features available on that processor model.

The creation target model may be a specific processor model (such as POWER5), or may be one of several values (such as "Current" , "Legacy" and "Common"). The most important of these special values is "Current" , meaning that the program should take advantage of all hardware features in any environment in which it is built. During initial creation of the program, specifying the special value "Current" is equivalent to specifying the creation target model of the current system. When an object is rebuilt on any system and has a creation target model of "Current" , the value of "Current" is interpreted to mean the model of the system. Preferably, "Current" is the default creation target model, which may be overridden by specifying a specific processor model or another special value.

"Legacy" processor model refers to all processor models of a processor architecture family prior to a given processor model and consisting only of legacy feature(s), such as a legacy instruction set. For example, those aspects of the PowerPC AS instruction set that are available on all target models are included in a legacy instruction set. Unlike hardware features, no aspect of the legacy instruction set is optional. Legacy processor models do not include any optional hardware features. Accordingly, specifying the special value "Legacy" will mean that the program will not take advantage of any optional hardware features.

"Common" processor model refers to the least-rich processor model of a processor architecture family supported by the target operating system release (i.e., the version of the operating system on which the machine code produced by the compiler is to run). Thus, code generated for the special value "Common" will run correctly on all models supported by the target operating system release.

The creation target model may be later overridden when the object is converted. Accordingly, a brief discussion of this aspect of object conversion is helpful at this point. Object conversion, however, is discussed in greater detail below with reference to FIG. 9. When the creation target model is overridden when the object is converted, the overriding target model is called the effective target model. Both the creation and effective target models will be stored by the back-end compiler. The creation target model is always set explicitly at (re-)creation. On the other hand, the effective target model may be set implicitly at object conversion time. If no object conversion has taken place, the effective target model is the same as the creation target model.

Referring now back to FIG. 8, during compilation, the back-end compiler generates and records machine code (step 820) from an intermediate representation (IR) of the program. The back-end compiler assumes that all features available on the selected target model can be used during code generation. Preferably, the back-end compiler is an enhanced version of an optimizing compiler that performs various optimizations that enable the machine code to execute on the particular platform in a faster and more efficient manner, such as described previously with respect to the prior art back-end compiler 220 in FIG. 2. Preferably, the intermediate representation of the program is stored with the machine code, or at least locatable from the machine code.

Also during compilation, the program feature set is produced and recorded for each created module by the back-end compiler (step 830). If and only if the back-end compiler makes use of a specific feature (i.e., if and only if the module object contains generated code that depends upon the presence of that hardware feature), the back-end compiler records the feature in the program feature set at step 830. The back-end compiler will assume that all features in the target model are available for each module object, and prepare an effective feature set consisting of the subset of those features that are actually used in the generated code for the module object. Program objects will also contain an effective feature set, which is defined as the union of the effective feature sets of its constituent module objects. Thus, the program feature set will be a subset of the feature set of the target model and is recorded at a granular level based on the use of optional hardware features. Preferably, steps 820 and 830 (i.e., generating and saving the machine code and the program feature set) include encapsulating the intermediate representation of the program. According to the preferred embodiments, before a program can be executed, at least initially, it must be checked for compatibility with the current processor (step 840). It is not necessary to perform a complete compatibility check each time a program is to be executed. For example, it is sufficient to determine that the program has previously passed the check, and nothing has changed to invalidate the previous check (such as replacing the processor with a new model).

Figure 9:
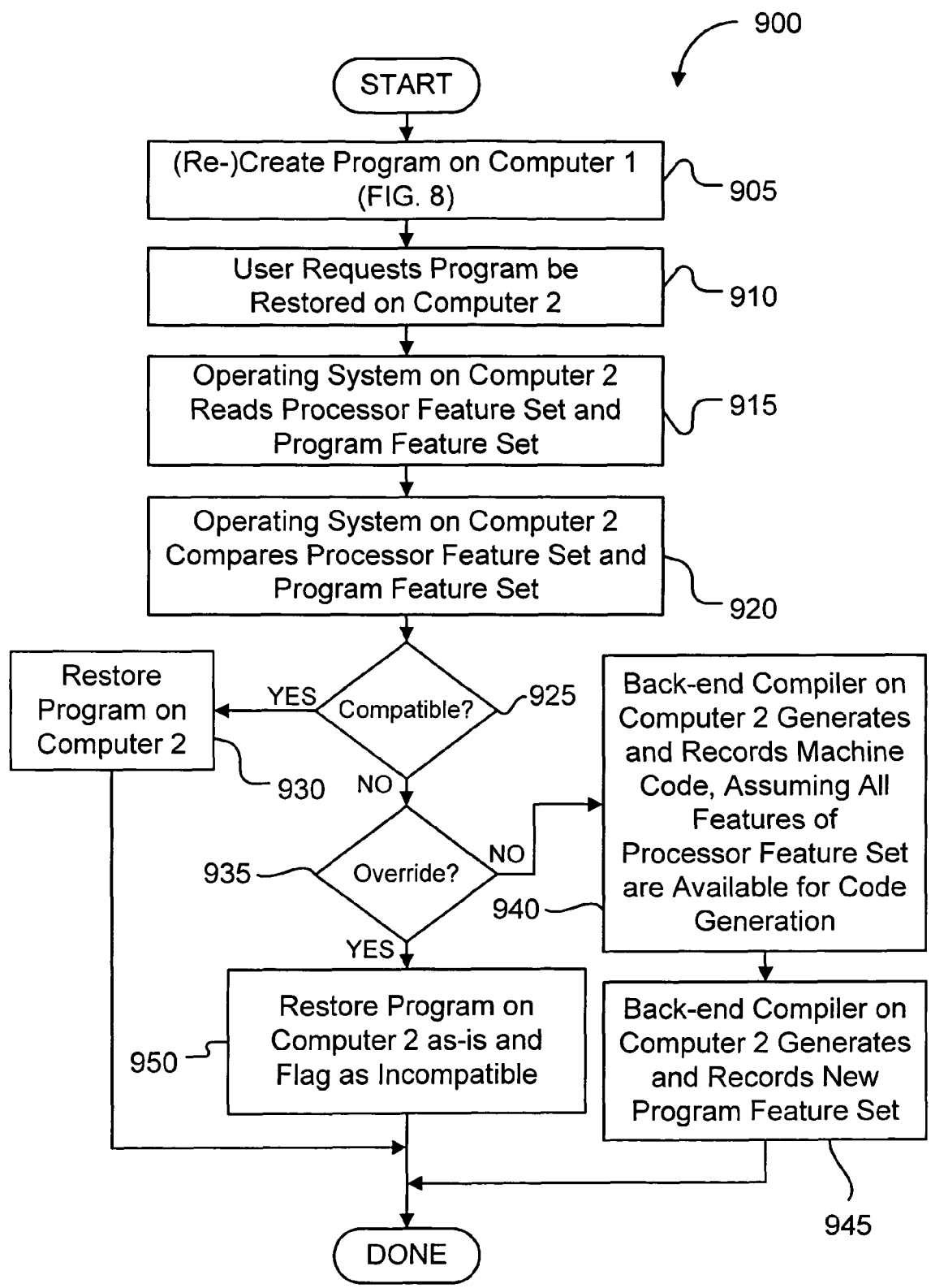
FIG. 9 is a flow diagram showing a method for adaptively generating code when compiling a computer program on a first computer system and restoring the computer program on a second computer system in accordance with the preferred embodiments.

FIG. 9 is a flow diagram showing a method 900 for adaptively generating code when compiling a computer program on a first computer system and restoring the computer program on a second computer system in accordance with the preferred embodiments. Method 900 generates code for a module or program object initially through object (re-)creation on a first computer system and object conversion on a second computer system. As mentioned above, according to the preferred embodiments of the invention, object conversion is an implicit process to rebuild an object using the object's intermediate representation. Object conversion may be initiated, for example, when a program or module object is restored or when a program is loaded for execution.

To avoid too much run-time checking, method 900 allows incompatibilities to be detected when a program saved on the first computer system is restored onto the second computer system (referred to herein as the "target system"). Method 900 begins with the program being saved on a first computer system (step 905). Preferably, saving step 905 includes steps analogous to steps 810, 820 and 830 of method 800 shown in FIG. 8. That is, the user specifies a "target processor model" for initial creation of the program's machine code on the first computer system (analogous to step 810); the first computer system's back-end compiler generates machine code, assuming all of the features on the target processor model are available for code generation (analogous to step 820); and the first computer system's back-end compiler generates and records the program feature set (analogous to step 830).

Referring back to FIG. 9, method 900 continues with the user requesting restore of the program on a second computer system, i.e., the target system (step 910). It should be understood that to "restore" a program onto a system, as the terminology is used herein and in the claims, does not imply that the program was previously on that system and expressly extends to systems on which the program was not previously stored. The target system has access to the machine code, intermediate representation, and program feature set that were recorded on the first computer system at step 905. This access may be accomplished through suitable signal bearing media including recordable type media, such as floppy disks and CD-RWs, and transmission type media, such as digital and analog communication lines. The operating system (OS) on the target system contains the processor feature set. During restore, then, the program feature set and the processor feature set are read (step 915) and compared (step 920) by the operating system on the target system. An object is compatible with a target model (or a system implementing the target model) if every member of the feature set of the object is present in the feature set of the target model. If the program uses only features that are available on the target system (i.e., the program feature set compares favorably with the processor feature set), the program is compatible (step 925: YES) and the restore operation proceeds normally (step 930) on the target system. On the other hand, if the program uses features that are not available on the target system (i.e., the program feature set miscompares with respect to the processor feature set), the program is incompatible (step 925: NO) and several options are available, selectable by a system option and overridable by the user (step 935). If the user overrides the rebuild (step 935: YES), the program is restored as-is and flagged as incompatible with the current processor (step 950). On the other hand, if the user does not override the rebuild (step 935: NO), the back-end compiler on the target system rebuilds the program, assuming that all of the features on the target system (i.e., the effective target model represented by the processor feature set) are available for use (step 940). In addition, the back-end compiler on the target system generates and records a new program feature set (step 945).

As shown in FIG. 9, the default action with respect to override step 935 is preferably to rebuild the program, however, those skilled in the art will appreciate that the spirit and scope of the present invention is not so limited. For example, the default action may instead be to restore the program as-is and flag it as incompatible with the current processor.

According to the preferred embodiments, an intermediate representation (IR) of the program is stored with the program's machine code to facilitate rebuilding the program. In the preferred embodiments, the intermediate representation is the Machine Interface (MI) for eServer iSeries. However, those skilled in the art will appreciate that the spirit and scope of the present invention is not limited to any one form of intermediate representation. There are many other common forms of intermediate representation in use today, such as W-Code, Architectural Neutral Distribution Format (ANDF), Java bytecode, and Microsoft Intermediate Language (MSIL). Any of these forms of intermediate representation would be acceptable. Irrespective of the form, the intermediate representation is preferably stored with the program, or otherwise locatable from the program.

In an alternative embodiment of the present invention, a binary-to-binary retranslation may be used to rebuild the program without access to an intermediate representation. In other words, the program may be rebuilt by retranslation directly from the program's executable format. However, such a binary-to-binary retranslation is often inferior because important information about program semantics (such as aliasing of memory references) is lost in the pure executable format. For some complex features, it may be difficult to add or subtract features and still create an equivalent program, in the absence of an intermediate representation.

In another alternative embodiment of the present invention, if source code is available, source code (rather than intermediate representation) may be used to rebuild the program. This is not preferable on most computer systems, however, because source code is usually not shipped to customers, and because of the extra time needed to compile from source code.

At this point, it is important to note that programs that are incompatible with a given processor may nonetheless reside on a computer system that uses that processor. In one case, incompatible programs may be deliberately created locally. In another case, incompatible programs may be left incompatible during a restore operation. Allowing programs that are incompatible with a given processor to nonetheless reside on a computer system that uses the processor allows flexibility in building programs for use on other computer systems. However, if a user attempts to execute an incompatible program, preferably the program will be automatically rebuilt at that time, again taking full advantage of all the features of the local processor by applying the processor feature set.

In summary, the present invention allows developers to build programs to take advantage of new processor features, without having to maintain two versions and ensure that each user gets the correct version. If a user owns a computer system without a feature required by the program, the program will simply be rebuilt on restore to run correctly on that target computer system.

Furthermore, the present invention allows users that purchase new hardware to upgrade the performance of legacy code to take advantage of new processor features. The user may request an existing program be rebuilt to use all locally available features. Preferably, the program has an encapsulated intermediate representation from which the program may be rebuilt.

According to the preferred embodiments, a program is rebuilt only when necessary due to incompatibilities. This is a major advantage over JIT compilers that recompile code each time the program is loaded. Also, according to the preferred embodiments, an automatic upgrade path is provided for traditional, legacy code that does not have access to JIT technology, without the drawbacks of binary-to-binary retranslation.

It should be noted that when a programmer specifically chooses to use a processor feature, either by hand-coding it in assembler or by calling a specific subroutine, the processor feature is a necessary part of the program that cannot be overridden. In such a case, the preferred embodiments of the present invention do not rebuild the program with respect to a necessary processor feature.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer program product for adaptively generating code for a computer program, comprising:
   a plurality of executable instructions recorded on a non-transitory computer-readable recordable media, wherein the executable instructions, when executed by at least one processor of a digital computing device, cause the digital computing device to perform the steps of:
      compiling the computer program based on a creation target model specified for initial creation of the computer program, wherein the step of compiling the computer program includes translating source code into an intermediate representation (IR) of the computer program in a front-end compiler and transforming the intermediate representation (IR) of the computer program into machine code in a back-end compiler;
      producing a feature set of the computer program by recording features that are both available on the creation target model and used in the machine code generated in the back-end compiler, wherein the feature set of the computer program is produced in the back-end compiler;
      saving the compiled computer program and the feature set of the computer program, wherein the step of saving the compiled computer program and the feature set of the computer program includes encapsulating the intermediate representation (IR) of the computer program, wherein the saving step includes the step of saving the feature set of the computer program in a format that includes a plurality of fields, each corresponding to a particular one of a plurality of optional hardware features and each having a value indicative of use or non-use of that particular feature in the machine code.

2. The computer program product for adaptively generating code for a computer program of claim 1, wherein the executable instructions, when executed by at least one processor of the digital computing device, cause the digital computing device to further perform the step of:
   prompting a user to specify the creation target model as a specific processor model or a special value selected from a group consisting of legacy, common and current.

3. A computer program product for adaptively generating code for a computer program, comprising:
   a plurality of executable instructions recorded on a non-transitory computer-readable recordable media, wherein the executable instructions, when executed by at least one processor of a digital computing device, cause the digital computing device to perform the steps of:
      comparing a feature set of the computer program and a feature set of a processor of the digital computing device, wherein the processor of the digital computing device is a member of a processor architecture family and the feature set of the processor represents zero, one or more optional hardware features of the processor architecture family supported by the processor of the digital computing device including one or more of a single-instruction multiple-data (SIMD) unit, a graphics acceleration unit, a single instruction or set of instructions designed to support compression, and a single instruction or set of instructions designed to support encryption, and wherein the feature set of the computer program represents zero, one or more optional hardware features the computer program relies upon in its generated code including one or more of a single-instruction multiple-data (SIMD) unit, a graphics acceleration unit, a single instruction or set of instructions designed to support compression, and a single instruction or set of instructions designed to support encryption, wherein the comparing step includes the step of reading a program feature set saved in a format that includes a plurality of fields, each corresponding to a particular one of the optional hardware features and each having a value indicative of use or non-use of that particular feature in the computer program;
      rebuilding the computer program based on the feature set of the processor if the comparing step indicates that the computer program requires a feature not supported by the processor of the digital computing device, wherein the rebuilding step includes rebuilding the computer program from an intermediate representation (IR) of the computer program stored with the computer program or locatable from the computer program.

4. The computer program product for adaptively generating code for a computer program of claim 3, wherein the comparing step is performed in response to one of restoring the computer program onto the digital computing device or requesting execution of the computer program.

5. The computer program product for adaptively generating code for a computer program of claim 3, wherein the executable instructions, when executed by at least one processor of the digital computing device, cause the digital computing device to further perform the steps of:
   producing a new feature set of the computer program by recording features that are both available on the processor of the digital computing device and used in the code generated in the rebuilding step;
   saving the rebuilt computer program and the new feature set of the computer program.

6. The computer program product for adaptively generating code for a computer program of claim 3, wherein the feature set of the processor is contained in an operating system (OS) on the digital computing device.

7. An apparatus comprising:
   at least one processor;
   a memory coupled to the at least one processor;
   a computer program residing in the memory comprising a plurality of instructions;
   an adaptive code generation mechanism residing in the memory and executed by the at least one processor, the adaptive code generation mechanism being invoked during compilation of the computer program, the adaptive code generation mechanism comprising:
      a compiler function which compiles the computer program based on a creation target model specified for initial creation of the computer program, wherein the compiling function translates source code into an intermediate representation (IR) of the computer program in a front-end compiler and transforms the intermediate representation (IR) of the computer program into machine code in a back-end compiler;

a feature set producing function which produces a feature set of the computer program by recording features that are both available on the creation target model and used in the machine code generated in the back-end compiler, wherein the feature set of the computer program is produced in the back-end compiler;

a saving function which saves the compiled computer program and the feature set of the computer program and encapsulates the intermediate representation (IR) of the computer program, wherein the saving function saves the feature set of the computer program in a format that includes a plurality of fields, each corresponding to a particular one of a plurality of optional hardware features and each having a value indicative of use or non-use of that particular feature in the machine code.

8. An apparatus comprising:

at least one processor;

a memory coupled to the at least one processor;

a computer program residing in the memory comprising a plurality of instructions;

an adaptive code generation mechanism residing in the memory and executed by the at least one processor, the adaptive code generation mechanism being invoked in response to one of restoring the computer program or requesting execution of the computer program, the adaptive code generation mechanism comprising:

a feature set compare function which compares a feature set of the computer program and a feature set of the at least one processor, wherein the at least one processor is a member of a processor architecture family and the feature set of the at least one processor represents zero, one or more optional hardware features of the processor architecture family supported by the at least one processor including one or more of a single-instruction multiple-data (SIMD) unit, a graphics acceleration unit, a single instruction or set of instructions designed to support compression, and a single instruction or set of instructions designed to support encryption, and wherein the feature set of the computer program represents zero, one or more optional hardware features the computer program relies upon in its generated code including one or more of a single-instruction multiple-data (SIMD) unit, a graphics acceleration unit, a single instruction or set of instructions designed to support compression, and a single instruction or set of instructions designed to support encryption, wherein the feature set compare function reads a program feature set saved in a format that includes a plurality of fields, each corresponding to a particular one of the optional hardware features and each having a value indicative of use or non-use of that particular feature in the computer program;

a rebuilding function which rebuilds the computer program from an intermediate representation (IR) of the computer program based on the feature set of the at least one processor if the feature set compare function indicates that the computer program requires a feature not supported by the at least one processor.

\* \* \* \* \*